United States Patent [19]

Schulz et al.

[11] 4,172,643

[45] Oct. 30, 1979

[54] EXPOSURE MEASURING APPARATUS FOR PHOTOGRAPHIC CAMERAS

[75] Inventors: Wolfgang Schulz, Radebeul; Heinz Schulze, Dresden, both of German Democratic Rep.

[73] Assignee: Veb Pentacon Dresden Kamera und Kinowerke, Dresden, German Democratic Rep.

[21] Appl. No.: 871,570

[22] Filed: Jan. 23, 1978

Related U.S. Application Data

[63] Continuation of Ser. No. 765,319, Feb. 3, 1977, abandoned.

[30] Foreign Application Priority Data

Feb. 4, 1976 [DD] German Democratic Rep. ... 191078

[51] Int. Cl.² .............................................. G03B 7/08
[52] U.S. Cl. .................................. 354/23 R; 354/56; 354/59
[58] Field of Search .......................... 354/23 R, 53–56, 354/59, 155

[56] References Cited

U.S. PATENT DOCUMENTS

| 3,523,497 | 8/1970 | Holle | 354/55 |
| 3,864,699 | 2/1975 | Tsunekawa et al. | 354/56 X |

Primary Examiner—John Gonzales
Attorney, Agent, or Firm—William Anthony Drucker

[57] ABSTRACT

The invention relates to an apparatus for internal measurement of the exposure in photographic cameras where the light penetrating the picture-taking or objective lens is fed by way of a mirror to a photoelectric cell.

A marginal reflective surface faces the objective lens and surrounds a picture window adjacent the film surface. The marginal surface is formed as a concave mirror the optical axis of which is inclined to the optical axis of the objective lens so as to reflect part of the light therefrom to the photoelectric cell.

4 Claims, 4 Drawing Figures

U.S. Patent
Oct. 30, 1979
4,172,643
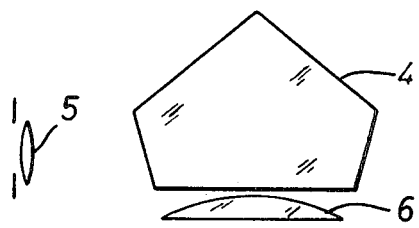
Fig.1
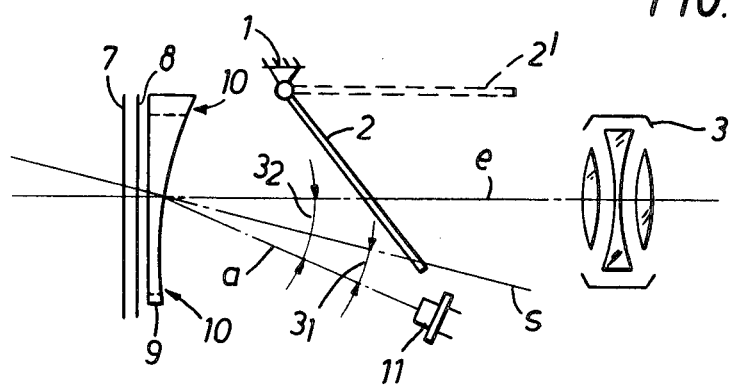
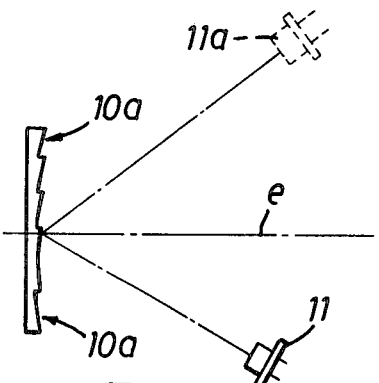
Fig.3
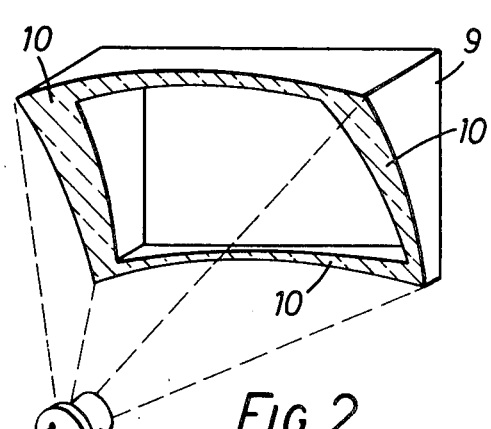
Fig.2
Fig.4

EXPOSURE MEASURING APPARATUS FOR PHOTOGRAPHIC CAMERAS

This is a continuation of Ser. No. 765,319 filed Feb. 3, 1977, now abandoned.

BACKGROUND OF THE INVENTION

The invention relates to an apparatus for internal measurement of the exposure in photographic cameras where the light penetrating the picture-taking or objective lens is fed by way of a mirror to a photoelectric cell.

In known cameras of this kind the photoelectric cell is illuminated by way of a hinged mirror which however on release of the camera is pivoted so that the photoelectric cell receives no more measurement light. For the requirements of exposure time formation according to brightness during the photographic exposure therefore expensive electric circuit arrangements are provided which store the exposure value measured before release of the camera, for the duration of the photographic exposure. Furthermore it is known to use the marginal zone of the picture window for the arrangement of a light-sensitive cell. However this arrangement requires excessively large marginal zones, whereby the size of the picture window is impaired. Furthermore undesired and uncontrollable reflection phenomena occur on the photoelectric cell.

The object of the invention is to avoid the above mentioned disadvantages by an improved arrangement for the illumination of the photoelectric cell.

SUMMARY OF THE INVENTION

According to the invention we provide an apparatus for internal measurement of exposure in photographic cameras, wherein the light penetrating through an objective lens is directed by way of a mirror to the photoelectric cell, the provision of a picture window, and, a marginal surface facing the objective lens and surrounding the picture window formed as a concave mirror the optical axis of which is inclined by an angle of incidence in relation to the optical axis of the objective lens.

This apparatus offers the advantage of small space requirement and by controllable reflection avoids undesired reflection phenomena. The marginal zone of the picture window facing the objective lens is preferably directly formed as a concave mirror. The concave mirror is expediently formed as a stepped mirror.

According to an advantageous arrangement the photoelectric cell is arranged at the focal point of the concave mirror.

BRIEF DESCRIPTION OF DRAWINGS

In the drawings:

FIG. 1 shows an example of measuring arrangement in accordance with the invention for use in single lens reflex camera;

FIG. 2 shows a perspective representation of the concave mirror;

FIG. 3 shows the apparatus according to FIG. 1 with stepped mirror; and

FIG. 4 shows a perspective representation of the stepped mirror.

DESCRIPTION OF PREFERRED EMBODIMENT

In the camera housing 1, which is not specially illustrated, a hinged mirror 2 is pivotably mounted (see FIG. 1) which can be moved alternately into the view-finding position and into the picture-taking position 2'. The light rays passing through an objective lens 3, after intermediate reproduction on the ground glass picture field lens 6, are conducted by the hinged mirror 2 by way of a prism 4 to an eyepiece 5. A picture window 9 is arranged in front of the film 7 and the shutter 8, in the direction of the light. The marginal zone 10 facing the objective lens 3 is formed as part of a plain concave mirror (see also FIG. 2), the optical axis s of which forms the angle of incidence 32 with the optical axis e of the picture-taking lens.

A photoelectric cell 11 (preferably a low-inertia photodiode) is arranged on the reflected ray a at the focal point of the concave mirror 10 and electrically connected in known manner with an exposure-measuring or exposure-regulating device.

In the example of embodiment according to FIGS. 3 and 4 the concave mirror is formed as stepped mirror 10a so that a lower construction height results along the optical axis e. According to the configuration of the concave mirror 10 the photoelectric cell 11 can also be arranged above the optical axis e of the picture-taking lens 3 (see position 11a) or laterally beside the optical axis e.

We claim:

1. In an apparatus for internal measuring of exposure in photographic cameras, wherein the light penetrating through an objective lens is directed by way of a mirror to the photoelectric cell, the provision of a picture window, and, a marginal surface facing the objective lens and surrounding the picture window formed as a concave mirror the optical axis of which is inclined by an angle of incidence in relation to the optical axis of the ojective lens.

2. Apparatus according to claim 1 wherein the marginal surface of the picture window facing the objective lens is directly formed as part of a plain concave mirror.

3. Apparatus according to claim 1 wherein the concave mirror is formed as stepped mirror.

4. Apparatus according to claim 1 wherein the photoelectric cell is arranged in the focal point of the concave mirror.